United States Patent
Jang et al.

(10) Patent No.: US 9,681,406 B2
(45) Date of Patent: Jun. 13, 2017

(54) METHOD AND APPARATUS FOR APPLYING A TIME ALIGNMENT TIMER IN A WIRELESS COMMUNICATION SYSTEM USING A CARRIER AGGREGATION TECHNIQUE

(71) Applicant: Samsung Electronics Co., Ltd., Suwon-si, Gyeonggi-do (KR)

(72) Inventors: Jae Hyuk Jang, Suwon-si (KR); Soeng Hun Kim, Yongin-si (KR); Kyeong In Jeong, Suwon-si (KR); Boon Loong Ng, Richardson, TX (US); Gert-Jan Van Lieshout, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/860,068

(22) Filed: Sep. 21, 2015

(65) Prior Publication Data
US 2016/0021628 A1     Jan. 21, 2016

Related U.S. Application Data

(63) Continuation of application No. 14/116,586, filed as application No. PCT/KR2012/003677 on May 10, 2012.
(Continued)

(51) Int. Cl.
*H04W 74/08* (2009.01)
*H04W 56/00* (2009.01)
(Continued)

(52) U.S. Cl.
CPC ..... *H04W 56/001* (2013.01); *H04W 56/0005* (2013.01); *H04W 56/0045* (2013.01);
(Continued)

(58) Field of Classification Search
USPC .......................................................... 370/328
See application file for complete search history.

(56) References Cited

U.S. PATENT DOCUMENTS

2007/0287440 A1* 12/2007 Benkert ............... H04W 24/04
                                                  455/422.1
2010/0074202 A1    3/2010 Park et al.
(Continued)

FOREIGN PATENT DOCUMENTS

KR    10-2008-0111407 A    12/2008
KR    10-2009-0098422 A    9/2009
(Continued)

OTHER PUBLICATIONS

Nokia Siemens Networks et al., Multiple Timing Advance, 3GPP draft, TSG-RAN WG2 Meeting #73bis in Shanghai, China, Apr. 11-15, 2011, R2-111897.
(Continued)

*Primary Examiner* — Jamal Javaid
*Assistant Examiner* — Kyaw Z Soe
(74) *Attorney, Agent, or Firm* — Jefferson IP Law, LLP (57) ABSTRACT

The present invention involves defining the operation of a terminal for determining which time alignment timer is to be applied to a certain condition when specific time alignment timers operate for each carrier-wave group in the event a wireless communication system uses a carrier aggregation technique. According to the present invention, a terminal may perform communication without malfunctions using a time alignment timer suitable for a certain condition. In detail, a method for a terminal to operate a time alignment timer according to the present invention comprises the steps of: receiving, from a base station, a message including a timing advance command and an index on a timing advance group (TAG); and operating the time alignment timer for the TAG, wherein the index has a value of 00 when the TAG (Continued)

includes a first cell. In the meantime, a method for a terminal to operate a time alignment timer according to the present invention comprises the steps of: operating a first time alignment timer for a first timing advance group (TAG) including a first cell; operating a second time alignment timer upon receipt of a timing advance command for a second TAG that does not include the first cell; and, if the first time alignment timer has expired, deeming the second time alignment timer to also be expired. In addition, a method for a base station to control a time alignment timer according to the present invention comprises the steps of: determining whether or not an uplink timing of a terminal needs correction; and transmitting a message including a timing advance command and an index on a timing advance group (TAG), wherein the index has a value of 00 when the TAG includes a first cell.

10 Claims, 9 Drawing Sheets

Related U.S. Application Data (60) Provisional application No. 61/484,645, filed on May 10, 2011.

(51) Int. Cl.
*H04W 64/00* (2009.01)
*H04W 36/04* (2009.01)
*H04W 48/12* (2009.01)

(52) U.S. Cl.
CPC ....... *H04W 64/00* (2013.01); *H04W 74/0833* (2013.01); *H04W 36/04* (2013.01); *H04W 48/12* (2013.01)

(56) References Cited

U.S. PATENT DOCUMENTS

| | | |
|---|---|---|
| 2010/0110897 A1 | 5/2010 | Chun et al. |
| 2010/0227569 A1* | 9/2010 | Bala ............... H04L 5/0007 455/73 |
| 2010/0296454 A1* | 11/2010 | Park ............... H04L 1/1812 370/328 |
| 2011/0200032 A1* | 8/2011 | Lindstrom ....... H04W 56/0045 370/350 |
| 2011/0243102 A1* | 10/2011 | Sebire ............. H04W 56/0045 370/336 |
| 2012/0008600 A1* | 1/2012 | Marinier ........... H04L 5/001 370/336 |
| 2012/0250520 A1* | 10/2012 | Chen ............... H04L 5/001 370/241 |
| 2012/0257570 A1 | 10/2012 | Jang et al. |
| 2012/0257601 A1* | 10/2012 | Kim ................ H04L 5/001 370/336 |
| 2013/0114576 A1* | 5/2013 | Kwon ............. H04L 5/001 370/336 |
| 2013/0188620 A1 | 7/2013 | Dinan |
| 2013/0272279 A1 | 10/2013 | Dinan |
| 2014/0369322 A1* | 12/2014 | Fwu ............... H04W 52/18 370/336 |

FOREIGN PATENT DOCUMENTS

| | | |
|---|---|---|
| WO | 2010-079941 A2 | 7/2010 |
| WO | 2012/138132 A2 | 10/2012 |
| WO | 2012/138142 A2 | 10/2012 |

OTHER PUBLICATIONS

Intel Corporation, Enhancements on MAC Procedures to Support CA with Multiple TA, 3GPP draft, TSG RAN2#74 Meeting in Barcelona, Spain, May 9-13, 2011, R2-113214.

Huawei et al., The Multiple Time Advances in Carrier Aggregation, 3GPP draft, TSG-RAN WG2 Meeting #73bis in Shanghai, China, Apr. 11-15, 2011, R2-111953.

Renesas Mobile Europe, Multiple Timing Advance Using Multiple RACH, 3GPP draft, TSG-RAN WG2 Meeting #74 in Barcelona, Spain, May 9-13, 2011, R2-113014.

* cited by examiner

METHOD AND APPARATUS FOR APPLYING A TIME ALIGNMENT TIMER IN A WIRELESS COMMUNICATION SYSTEM USING A CARRIER AGGREGATION TECHNIQUE

CROSS-REFERENCE TO RELATED APPLICATION(S)

This application is a continuation application of prior U.S. patent application Ser. No. 14/116,586, filed on Nov. 8, 2013, which is a U.S. National Stage application under 35 U.S.C. §371 of an International application filed on May 10, 2012 and assigned application number PC/KR2012/003677, which claimed the benefit of a U.S. Provisional application filed on May 10, 2011 in the U.S. Patent and Trademark Office and assigned U.S. patent application Ser. No. 61/484,645, the entire disclosure of each of which is hereby incorporated by reference.

TECHNICAL FIELD

The present invention relates to a wireless communication system and, in particular, to a method for operating a plurality of time alignment timers in a Long Term Evolution (LTE) system using multiple carriers.

BACKGROUND ART

Recently, the wireless communication technology has developed rapidly along with the advance of communication system technology, and the LTE system is one of the prominent 4th Generation mobile communication systems. In LTE, various technologies are adopted to meet the increase in demand for traffic volume, and carrier aggregation is one of the technologies. The carrier aggregation technology uses a primary carrier and one or more secondary carriers as compare to the legacy communication where a signal carrier is used between the terminal (User Equipment or UE) and the base station (evolved Node B or eNB) so as to be able to increase the transmission throughput in proportion to the number of secondary carriers. In LTE, the primary carrier is referred to as Primary Cell (PCell) and the secondary carrier as Secondary Cell (SCell).

Meanwhile, in the case that the locations of the eNB apparatuses using the primary and secondary carriers are changed with the use of repeater and Remote Radio Head, there is a need of change in uplink transmission timing. For example, when the eNB apparatuses using the primary and secondary carriers are located at different positions, the UE has to transmit the uplink signal to the eNB apparatus far from the UE as compared to the other eNB near the UE according to the UE location. In this case, i.e. when there are multiple uplink timings, there is a need of specifying detailed operations for managing the uplink timings.

SUMMARY

The present invention has been conceived to solve the above problem and aims to provide a method for managing a plurality of time alignment timers introduced along with the carrier aggregation technology in the wireless mobile communication system.

In accordance with an aspect of the present invention, a Timing Advance Timer (TAT) management method of a terminal in a wireless communication system including a primary cell and at least one secondary cell and using a carrier aggregation technology includes receiving a message including a Timing Advance Command and an index of Timing Advance Group (TAG) from a base station and starting the TAT for the TAG, wherein the index is set to 00 when the TAG includes the primary cell.

In accordance with another aspect of the present invention, a Timing Advance Timer (TAT) management method of a terminal in a wireless communication system including a primary cell and at least one secondary cell and using a carrier aggregation technology includes starting a primary TAT for a primary Timing Advance Group (TAG) including a primary cell, starting a secondary TAT when a Timing Advance Command for a secondary TAG including no primary cell, and regarding, when the primary TAT expires, that the second TAT expires.

In accordance with another aspect of the present invention, a Timing Advance Timer (TAT) management method of a base station in a wireless communication system including a primary cell and at least one secondary cell and using a carrier aggregation technology includes determining necessity of adjusting an uplink timing of a terminal and transmitting a message including a Timing Advance Command and an index of Timing Advance Group (TAG) to the terminal, wherein the index is set to 00 when the TAG includes the primary cell.

At this time, the time advance timer value is signaled, configured, and maintained per group having the same uplink timing in the present invention. Also, a method for determining the timing advance timer to be applied when a command for timing adjustment is received from the base station is proposed.

In more detail, if the Timing Advance Command is received through a random access response message, apply common time alignment timer (timeAlighmentTimerCommon) when the random access for idle to active transition is performed in PCell apply dedicated time alignment timer (timeAlighmentTimerDedicated) when the random access is performed for another reason excluding idle to active transition in PCell for example, when receiving random access command for Time Advance Group (TAG) including PCell, i.e. P-TAG, from eNB the PTAG identifier is set to 00 apply SCell time alignment timer (timeAlighmentTimerScell when the random access is performed in SCell for example, when receiving random access command for TAG including only SCells, i.e. S-TAG, from eNB the S-TAG identifier is set to an integer other than 00.

Also, if the timeAlighmentTimer for the PCell expires, the UE regards the uplink synchronization broken in all of the S-TAGs as well as P-TAG.

According to the present invention, if the access network load increases, the terminal as the MTC device backs off the initial access attempt to reduce the access network load of the base station. If necessary, the base station also may restrict the access of the MTC devices and apply backoff time to the MTC device restrictively.

DETAILED DESCRIPTION

Detailed description of well-known functions and structures incorporated herein may be omitted to avoid obscuring the subject matter of the present invention. Exemplary embodiments of the present invention are described with reference to the accompanying drawings in detail.

Figure 1:
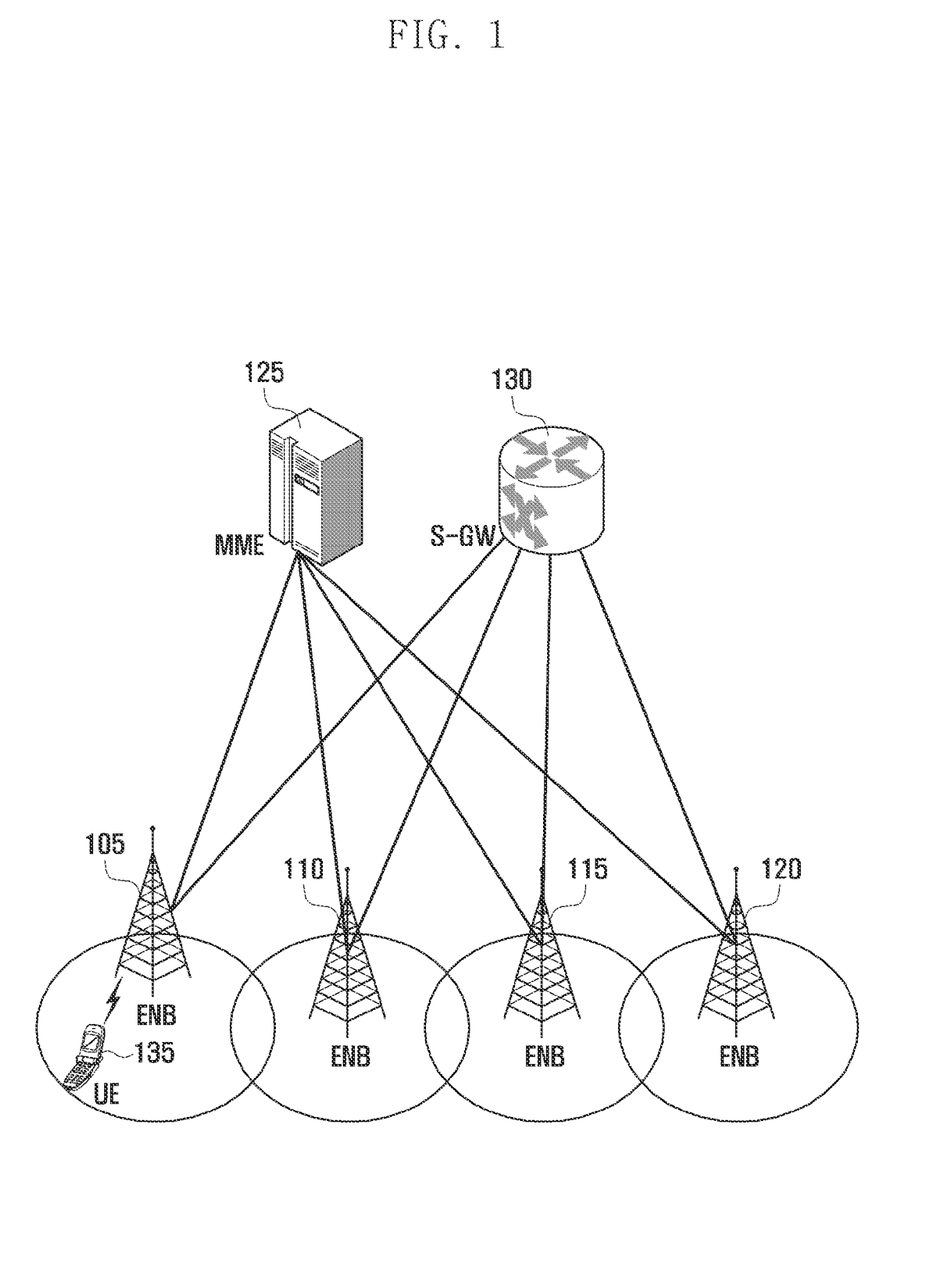
FIG. 1 is a diagram illustrating the architecture of an LTE system to which the present invention is applied.

FIG. 1 is a diagram illustrating the architecture of an LTE system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

In FIG. 1, the eNBs 105, 110, 115, and 120 corresponds to the legacy node Bs of the UMTS system. The eNBs allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state.

In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
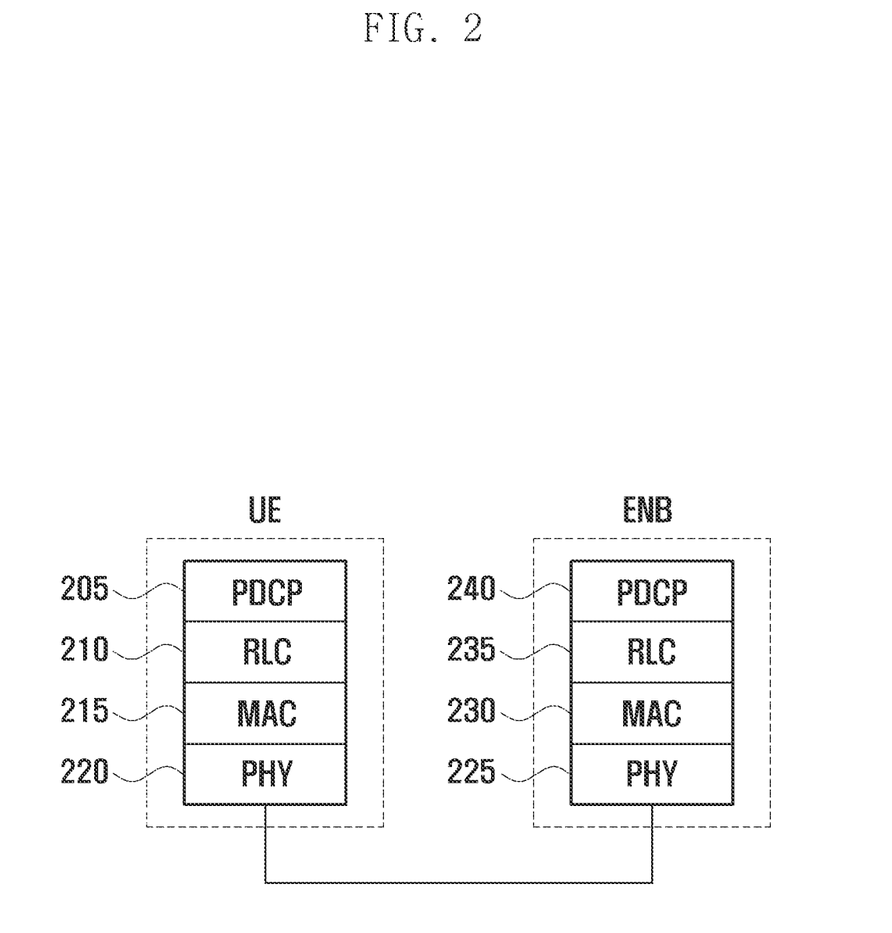
FIG. 2 is a diagram illustrating a protocol stack of the LTE system to which the present invention is applied.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size. The MAC 215 and 230 is responsible for establishing connection to a plurality of RLC entities so as to multiplex the RLC PDUs into MAC PDUs and demultiplex the MAC PDUs into RLC PDUs.

The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. Also, the PHY layer uses Hybrid ARQ (HARQ) for additional error correction by transmitting 1 bit information indicating for positive or negative acknowledgement from the receiver to the transmitter. This is referred to as HARQ ACK/NACK information. The downlink HARQ ACK/NACK corresponding to the uplink transmission is carried by Physical Hybrid-ARQ Indicator Channel (PHICH), and the uplink HARQ ACK/NACK corresponding to downlink transmission is carried Physical Uplink Control Channel (PUCCH) or Physical Uplink Shared Channel (PUSCH).

Figure 3:
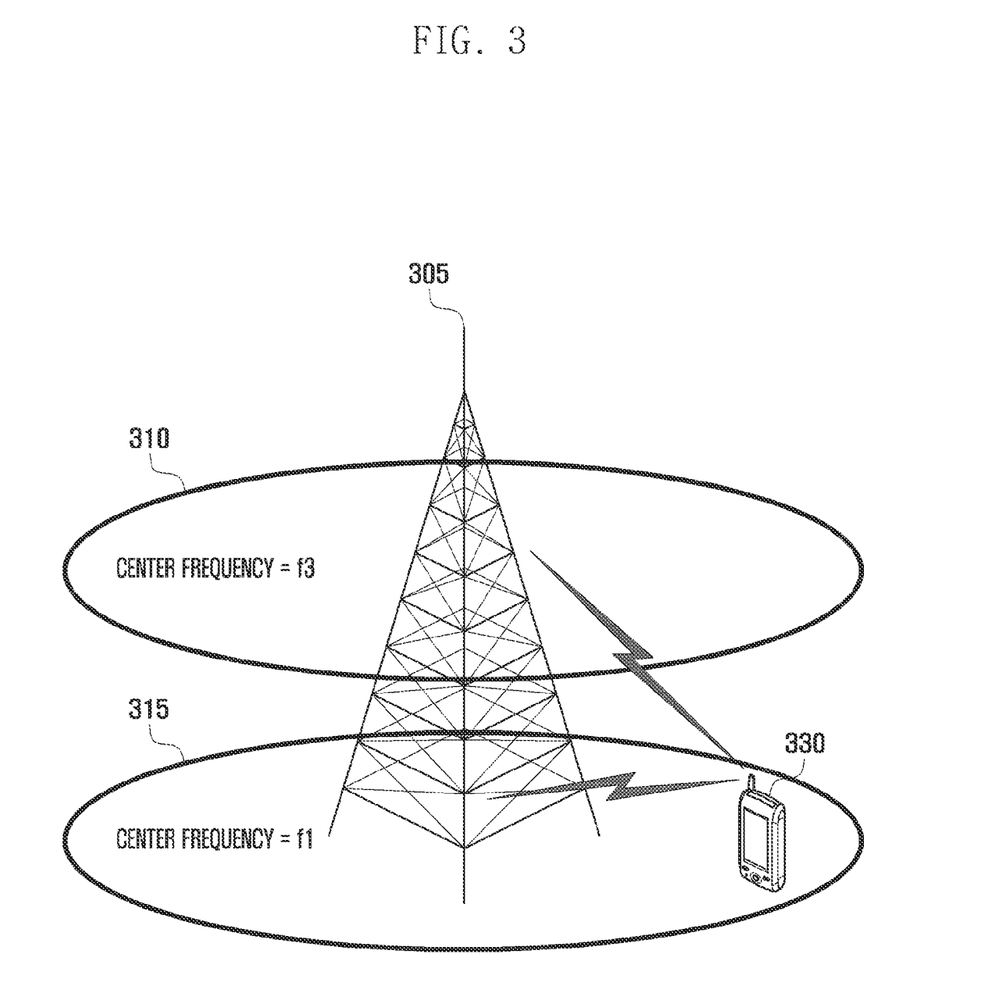
FIG. 3 is a diagram for explaining carrier aggregation from the view point of the UE.

FIG. 3 is a diagram for explaining carrier aggregation from the view point of the UE.

Referring to FIG. 3, typically an eNB can use multiple carriers transmitted and receive in different frequency bands. For example, the eNB 305 can be configured to use the carrier 315 with center frequency f1 and the carrier 310 with center frequency f3. If carrier aggregation is not supported, the UE 330 has to transmit/receive data unit one of the carriers 310 and 315. However, the UE 330 having the carrier aggregation capability can transmit/receive data using both the carriers 310 and 315. The eNB can increase the amount of the resource to be allocated to the UE having the carrier aggregation capability in adaptation to the channel condition of the UE so as to improve the data rate of the UE.

In case that a cell is configured with one downlink carrier and one uplink carrier as a conventional concept, the carrier aggregation can be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. Although the description is directed to an LTE mobile communication system for explanation convenience, the present invention can be applied to other types of wireless communication systems supporting carrier aggregation.

Figure 4:
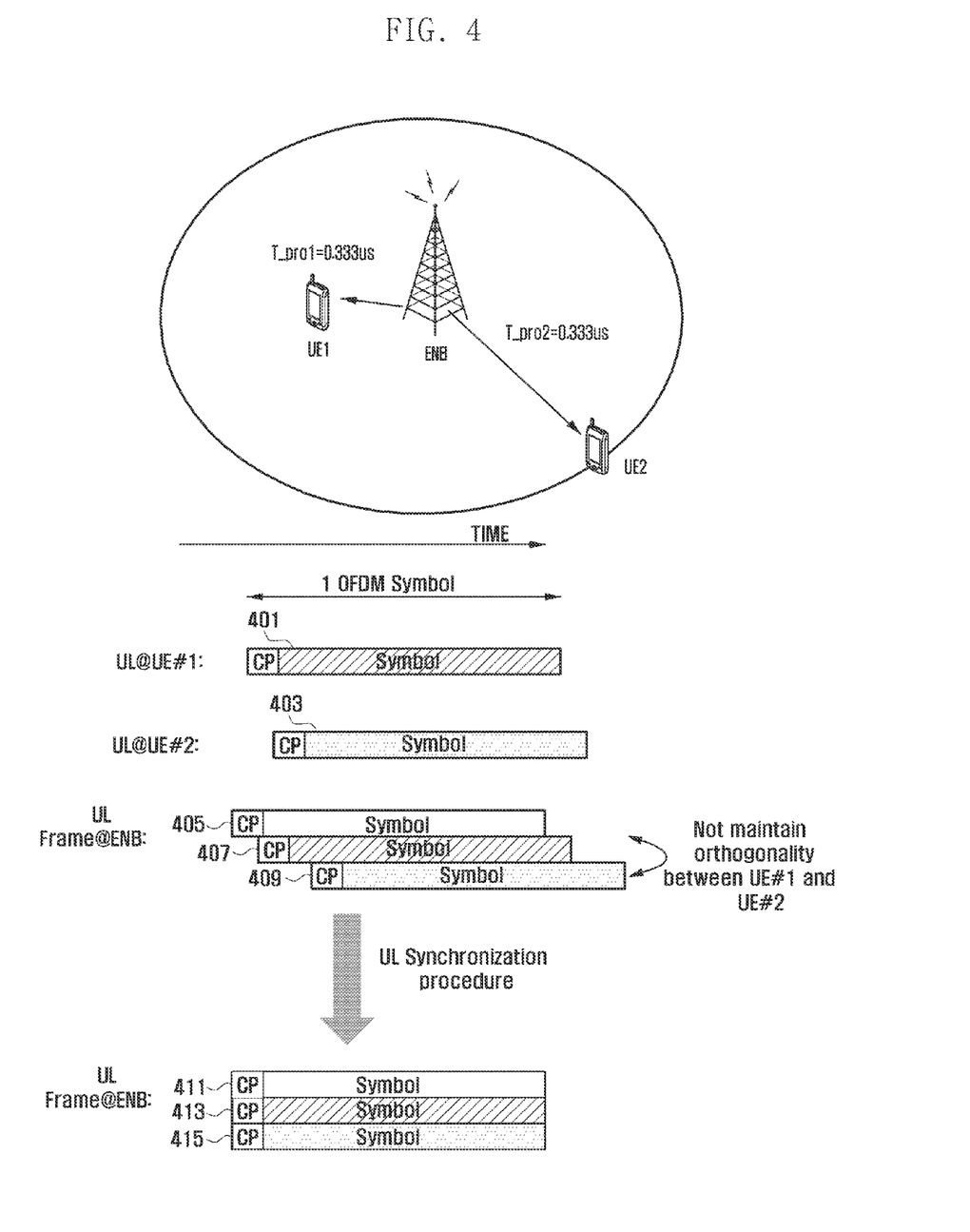
FIG. 4 is a diagram illustrating the necessity and role of the uplink timing synchronization procedure.

FIG. 4 is a diagram illustrating a principle of uplink timing synchronization in the OFDM-based 3GPP LTE system to which the present invention is applied.

The UE1 is located near the eNB and the UE2 is located far from the eNB. T_pro1 indicates the first propagation delay time to the UE1, and T_pro2 indicates the second propagation delay to the UE2. As shown in FIG. 4, the UE1 locates near the eNB as compared to the UE2 and thus has a relatively short propagation delay (in FIG. 4, T_pro1 is 0.333 us, and T_pro2 is 3.33 us).

In a cell of the eNB of FIG. 4, when the UE 1 and UE 2 power on or are operating in idle mode, there is a problem of synchronization mismatch among the uplink timings of the UE 1 and UE 2 and other UEs detected by the eNB within the cell.

Reference number 401 denotes uplink OFDM symbol transmission timing of the UE1, and reference number 403 denotes uplink OFDM symbol transmission timing of the UE2. By taking notice of the uplink transmission propagation delays of the UE1 and UE2, the eNB may receive the uplink OFDM symbols at the timings as denoted by reference numbers 407 and 409.

That is, the UE1's uplink symbol is received by the eNB at the timing 407 with a short propagation delay while the UE2's uplink symbol transmitted is received by the eNB at the timing 409 with relatively long propagation delay.

Since the timings 407 and 409 precede the synchronization between the uplink transmission timings of the UE1 and UE2, the uplink OFDM symbol reception and decoding start timing 405 of the eNB, the UE1's uplink OFDM symbol reception timing 407, and the UE2's uplink OFDM symbol reception timing 409 are different among each other.

In this case, the uplink symbols transmitted by the UE1 and UE2 are not orthogonal so as to interfere to each other and, as a consequence, the eNB is likely to fail decoding the uplink symbols transmitted, at the timing 401 and 403, by the UE1 and UE2 due to the interference and the mismatch between the uplink symbol reception timings 407 and 409.

Uplink timing synchronization is a procedure for acquiring the eNB's uplink symbol reception timings with the UE1 and UE2 and, if the uplink timing synchronization procedure completes, the eNB receives uplink OFDM symbol to acquire decoding start timing as denoted by reference numbers 411, 413, and 415.

In the uplink timing synchronization procedure, the eNB transmits Timing Advance (hereinafter, referred to as TA) information to the UEs to notify of the timing adjustment amount.

The TA information may be transmitted in the Random Access Response (RAR) message in response to the random access preamble transmitted by the UE for initial access or in the Timing Advance Commence MAC Control Element (TAC MAC CE). The UE is capable of adjusting the uplink transmission timing based on the TA information.

The UE which has received the TA information starts a time alignment timer (timeAlignmentTimer, TAT). The TAT is the timer indicating whether the TA is valid. That is, the TA is valid in the TAT duration but its validity is not guaranteed after the expiry of the TAT.

If the TA information is received again afterward, the UE restarts the TAT and, if the TAT expires, it determines that the TA information is not valid any long and thus stops uplink transmission to the eNB.

By synchronizing the timings as described above, the symbols transmitted by the UE1 and UE2 maintain orthogonality such that the eNB is capable of decoding the uplink symbols 401 and 403 transmitted by UE1 and UE2 successfully.

Figure 5:
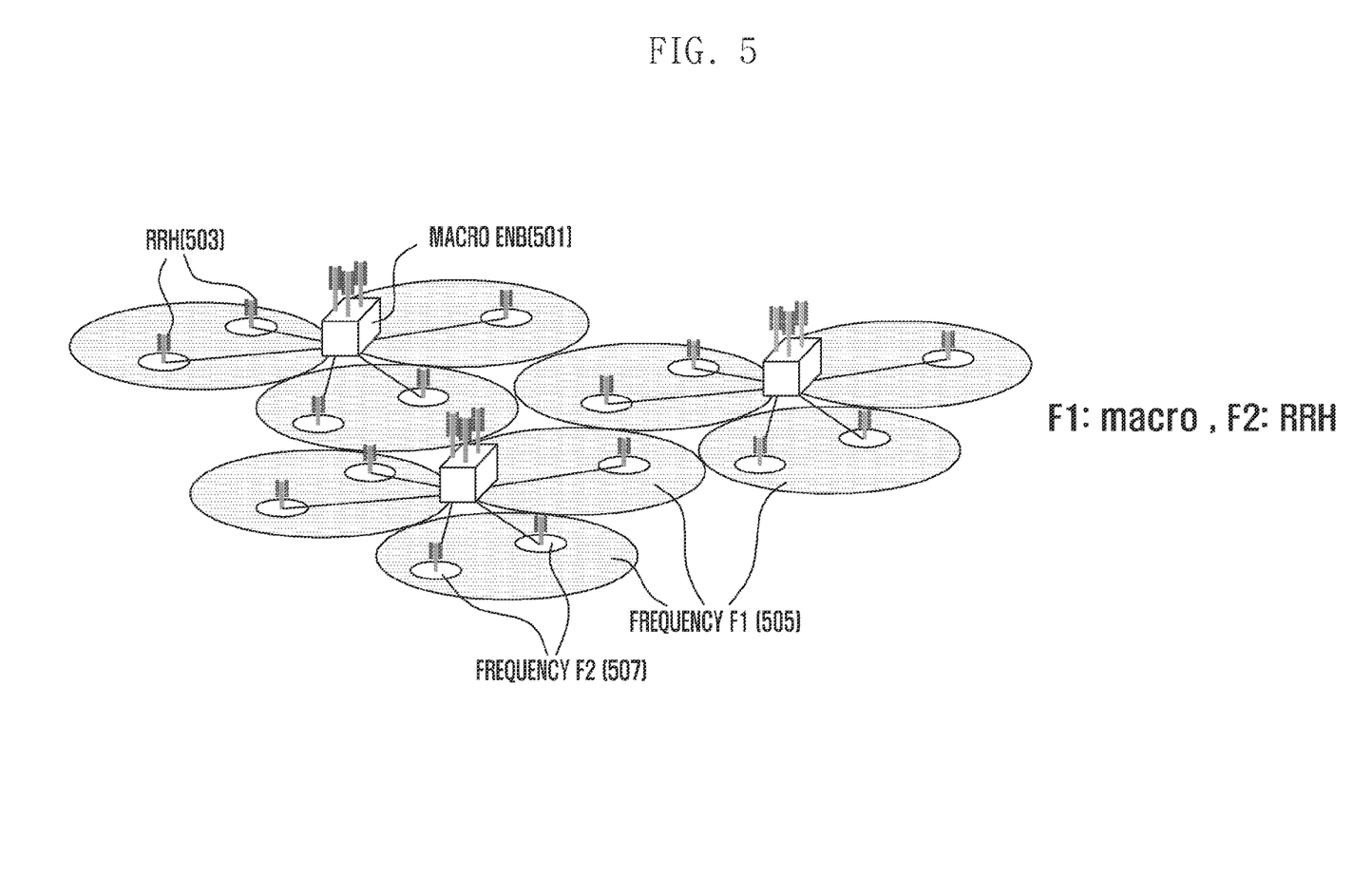
FIG. 5 is a diagram for explaining a case where the apparatus using the primary and second carriers are located at different positions in the carrier aggregation system.

FIG. 5 is a diagram for explaining a case where the apparatus using the primary and second carriers are located at different positions in the carrier aggregation system.

In FIG. 5, the Remote Radio Heads (RRHs) 503 using the frequency band F2 507 are deployed around the macro eNB 501 using the frequency band F1 505.

If the UE uses the macro eNB and the RRH simultaneously at a position near the RRH, although it transmits a signal to the RRH with a certain delay, the signal may arrives at an appropriate timing due to the short distance. In contrast, in order for the signal to arrive at the macro eNB at an appropriate timing, the UE has to transmit the signal a little earlier due to the long distance. That is, when the UE operates in carrier aggregation mode, it is necessary to synchronize the plural uplink timings. There is therefore a need of a method for operating TATs for the uplink timings.

In an embodiment of the present invention, the eNB sorts the carriers having the same or similar uplink timings into a group for facilitating management. This is referred to as Timing Advance Group (TAG).

For example, if there are one PCell (or primary cell) and three SCells (or secondary cell) A, B, and C and if the PCell and SCell A have similar uplink timings, the PCell and SCell A is sorted into group 1 and SCells B and C into group 2 for facilitating management.

If the eNB commands uplink timing adjustment for group 1 by transmitting TA information through TAC MAC CE or RAR, the UE adjusts uplink timings of the PCell and SCell A based on the information included in the TAC MAC CE. The UE also starts TAT for group 1 upon receipt of the TA information.

The TAT is the timer indicating validity of the TA information such that the uplink data transmission on the carriers belonging to the group 1 (i.e. PCell and SCell A) is possible only when the TAT of the group 1 is running. If the TAT expires, the TA information becomes invalid and thus the UE cannot transmit data on the corresponding carrier until new TA information is received form the eNB.

The TAT of the group including the PCell such as group 1, i.e. P-TAG, is referred to as P-TAG TAT, and the TAT of the group including no PCell such as group 2 is referred to as S-TAG TAT.

Figure 6:
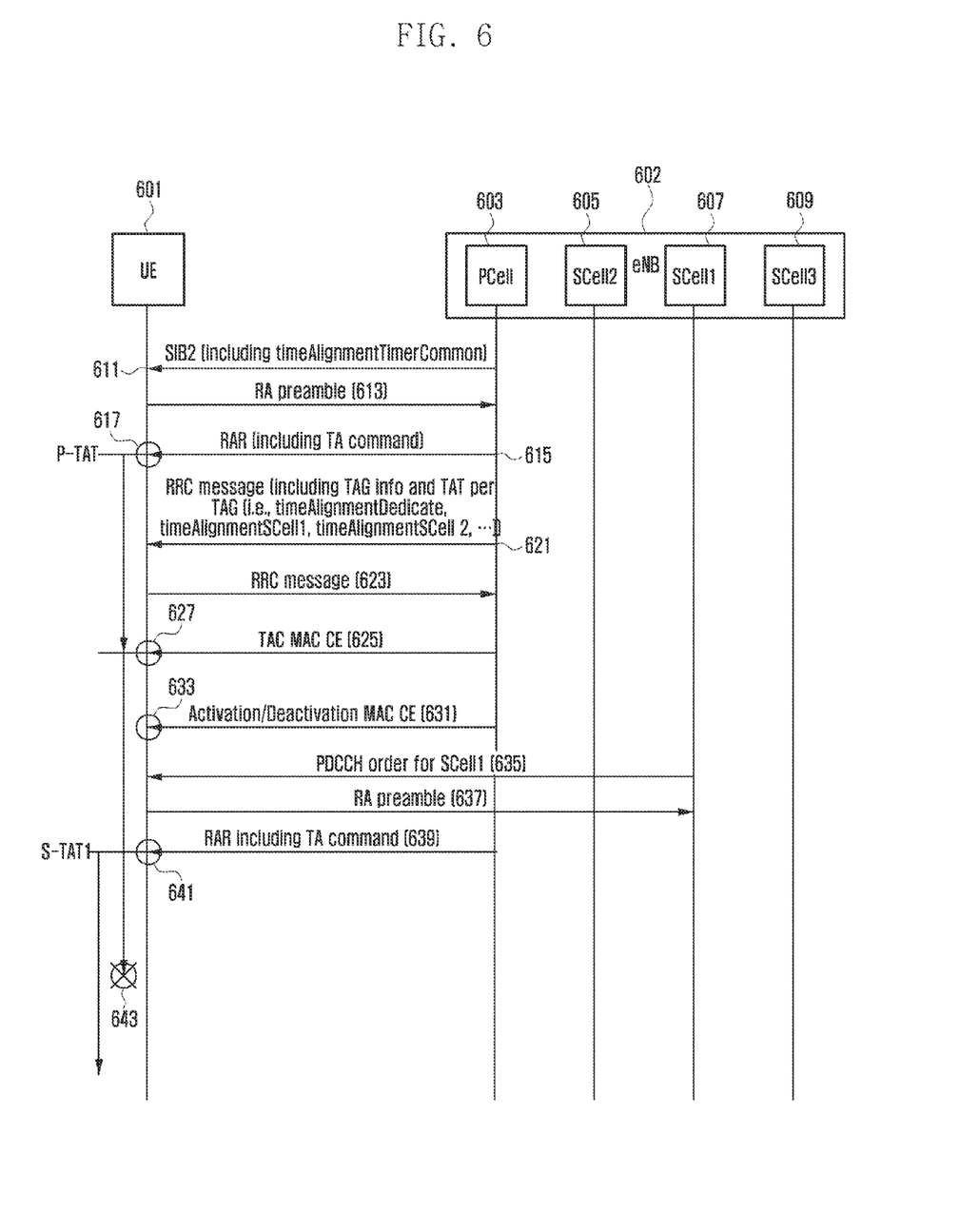
FIG. 6 is a signal flow diagram illustrating signal flows between eNB and UE and operation procedure of the UE according to an embodiment of the present invention.

FIG. 6 is a signal flow diagram illustrating signal flows between eNB and UE and operation procedure of the UE according to an embodiment of the present invention.

In the present invention, the UE 603 attempts access to the eNB 602. For explanation convenience, it is assumed that the eNB has four cells 603, 605, 607, and 609.

The UE receives one a System Information Block (SIB) from a cell of the eNB to acquire system information of the corresponding cell. The SIB may be one of SIB1, SIB2, and SIB3 carrying different informations and, in this embodiment, the eNB transmits 'common time alignment timer (timeAlighmentTimerCommon)' in the SIB2 among the SIBs. The common time alignment timer is the timer used in the PCell when the UE does not receive 'dedicated time alignment timer' or 'SCell time alignment timer' form the eNB. This timer is used in the random access procedure for the UE to transition from idle state to active stat. This is described in detail later.

If the SIB2 is received at step 611, the UE stores the 'common time alignment timer' and transmits a Random Access Preamble to the cell at step 613. The Random Access Preamble is a special signal transmitted from the UE to the cell for uplink access or synchronization.

If the random access preamble is received successfully, the eNB transmits a Random Access Response (RAR) message at step 615. The RAR includes Timing Advance (TA) command as the information on how much bring forward/back the uplink timing based on the UE's uplink timing (here, the time when the Random Access Preamble has been transmitted).

The UE starts the TAT for the cell (here, PCell 603) upon receipt of the RAR at step 617. It is assumed that the uplink synchronization between the cell and the UE is acquired while the TAT is running, and thus the cell may perform resource allocation to the UE for uplink data transmission. The TAT expiry time corresponds to the time when the 'common timer alignment timer' received at step 611 expires.

By taking notice that the UE supports carrier aggregation, the eNB determines to configure carrier aggregation to the UE and configures a plurality of carriers aggregated to the UE through a Radio Resource Control (RRC) message at step 621. The RRC message includes the information on the TAGs associated with the multiple carriers (the drawing is depicted under the assumption of P-TAG including PCell and SCell2 and S-TAG1 including SCell1 and SCell3) and per-TAG TAT values). The P-TAG is indicated by the lowest index (e.g. 00 in the case of using two bits) which is a fixed value and thus the P-TAG value may be omitted in the RRC message.

The per-TAG TATs consists of 'dedicated TAT' for P-TAG and 'SCell TAT' for S-TAG and, if there are plural S-TAGs, the per-SCell TAT values may be identical with or different from each other. The RRC message may be the RRC Connection Reconfiguration (RRCConnectionReconfiguration) message.

Upon receipt of this message, the RRC layer of the UE transmits a message confirming the configuration at step 623. The confirmation message may be the RRC connection Reconfiguration Complete (RRCConnectionReconfigurationComplete) message.

Afterward, the eNB may command the timing adjustment of the corresponding cell for acquiring uplink timing synchronization before expiry of the P-TAG TAT of the UE. For this purpose, the eNB sends the UE a Timing Advance Command MAC Control Element (TAC MAC CE) at step 627.

In the present invention, the TAC MAC CE includes cell identifiers to notify of the TAG of which uplink timing is adjusted among multiple TAGs and the P-TAG including the PCell is indicated with a lowest value index, e.g. 00 in the case of using two bits. In the case of using the two-bit index, an S-TAG may be indicated by one of 01, 10, and 11.

Upon receipt of the TAC MAC CE, the UE restarts the TAT of the TAG (in the drawing, P-TAG represented by '00') indicated by the TAC MAC CE at step 627. At this time, the restarted P-TAG TAT is set to the value of the 'dedicated TAT' received at step 621.

At step 631, the eNB transmits the activation command message for activating the SCells configured at step 621 through the RRC message. In the LTE system, the Activation/Deactivation MAC CE is used as the activation command message. The SCells configured through the Activation/Deactivation MAC CE are marked by 1 and 0 respectively in the bitmap to indicate whether to be activated/deactivated. In the drawing, it is assumed that all of SCells, i.e. SCell1, SCell2, and SCell3, are activated.

Although the Activation/Deactivation MAC CE, the UE cannot transmit uplink signal until the corresponding cell is activated or the uplink synchronization is acquired at step 633.

The eNB may command to transmit a Random Access Preamble to acquire uplink synchronization for the SCells of the UE at step 635. This command is referred to as Physical Dedicated Control Channel (PDCCH) order in the LTE system. The PDCCH order may be transmitted in downlink of the corresponding SCell or PCell or another SCell through the cross carrier scheduling. In the case of using the cross carrier scheduling, the PDCCH order message includes the cell identifier indicating the cell through which the preamble is to be transmitted.

Upon receipt of the PDCCH order, the UE transmits the Random Access Preamble through the corresponding cell (SCell1 607 in the drawing) at step 637.

If the Random Access Preamble is received successfully, the eNB transmits an RAR in reply at step 639. The RAR message includes the TA command for uplink timing adjustment of the UE and, upon receipt of the TA command, the UE starts the TAT of the S-TAG (S-TAG TAT 1 in the drawing) including the corresponding cell (SCell1 607 in the drawing) or restarts, if it is running, the corresponding TAT at step 641.

In the drawing, the two TAT (i.e. P-TAG TAT and S-TAG TAT1) are running an thus the uplink data transmission is possible through all of the PCell, SCell1, SCell2, and SCell3.

Afterward, if the P-TAG TAT as the dedicated time alignment timer expires at step 643, it is regarded that the synchronization is broken in all of the TAGs including P-TAG and S-TAGs in the present invention.

Figure 7:
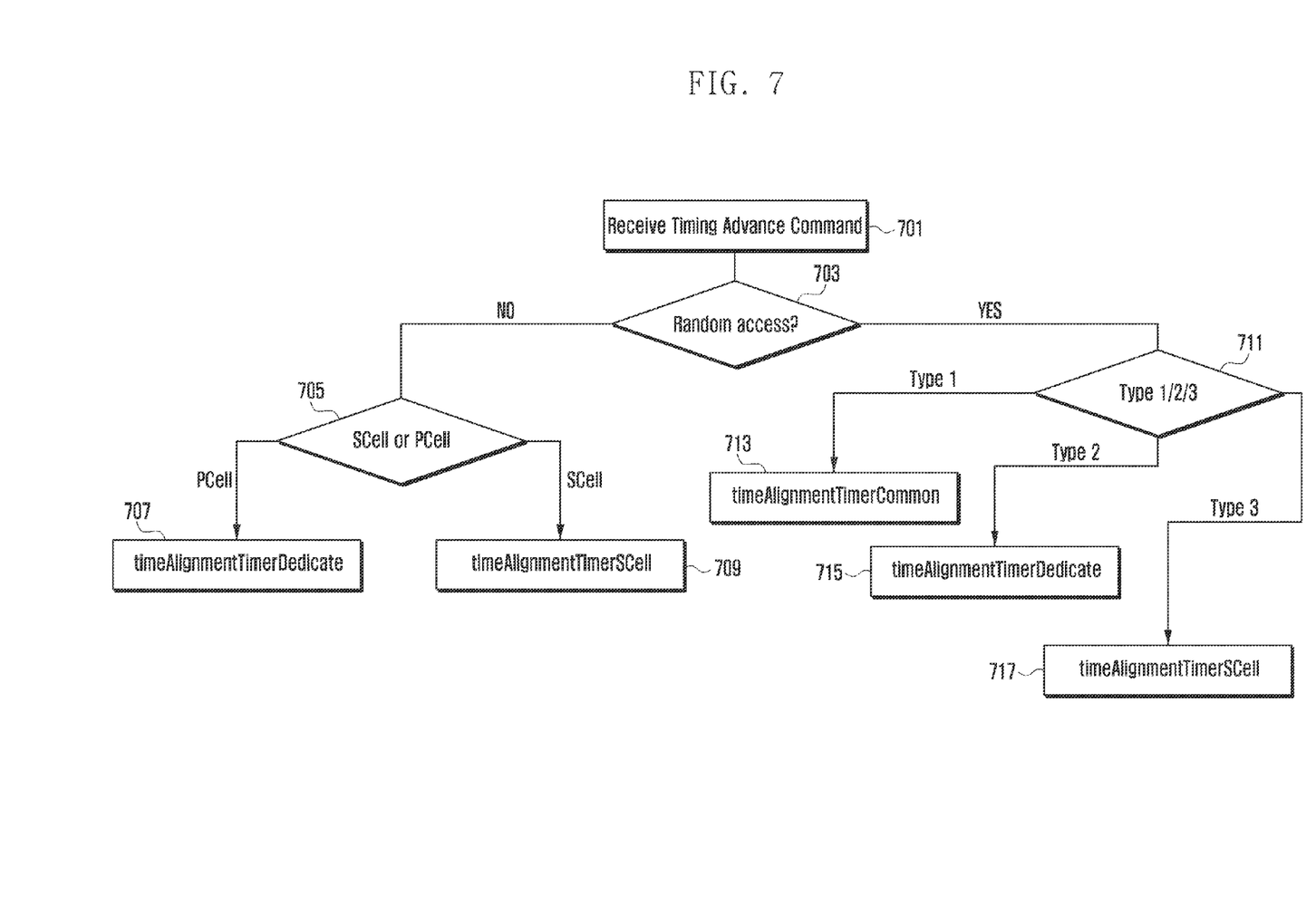
FIG. 7 is a flowchart illustrating operation procedure of the UE according to an embodiment of the present invention.

FIG. 7 is a flowchart illustrating operation procedure of the UE according to an embodiment of the present invention.

In the flowchart, it is assumed that the UE receives the TA command from the eNB. If the UE receives the TA command at step 701, the UE determines whether the TA command is transmitted through random access (i.e. included in RAR) or TAC MAC CE at step 703.

If TA command is received through the TAC MAC CE, the UE determines whether the TA command is of P-TAG or S-TAG based on the cell identifier included in the TAC MAC CE at step 705. If the TA command is of the P-TAG, i.e. the identifier is set to 00 as aforementioned, the UE applies the dedicated time alignment timer (timeAlightmentTimerDedicated) configured through the RRC message as described with reference to FIG. 6 at step 707 and, otherwise if the TA command is of the S-TAG, the SCell time alignment timer (timeAlighmentTimerScell) at step 709.

If the TA command is received through the random access procedure, the UE determines one of the following three cases at step 711.

Type 1: performing random access for idle to active transition in PCell

Type 2: performing random access caused by another reason excluding idle to active transition in PCell for example, when receiving random access command for P-TAG from eNB Type 3: performing random access in SCell for example, receiving random access command for S-TAG from eNB In the case of type 1, the common time alignment timer (timeAlighmentTimerCommon) is applied at step 713.

In the case of type 2, the dedicated time alignment timer (timeAlighmentTimerDedicated) is applied at step 715.

In the case of type 3, the SCell time alignment timer (timeAlighmentTimerScell) is applied at step 717.

Afterward, if the P-TAG TAT expires, it is regarded that the uplink synchronization is broken in all of the S-TAGs as well as P-TAG.

Figure 8:
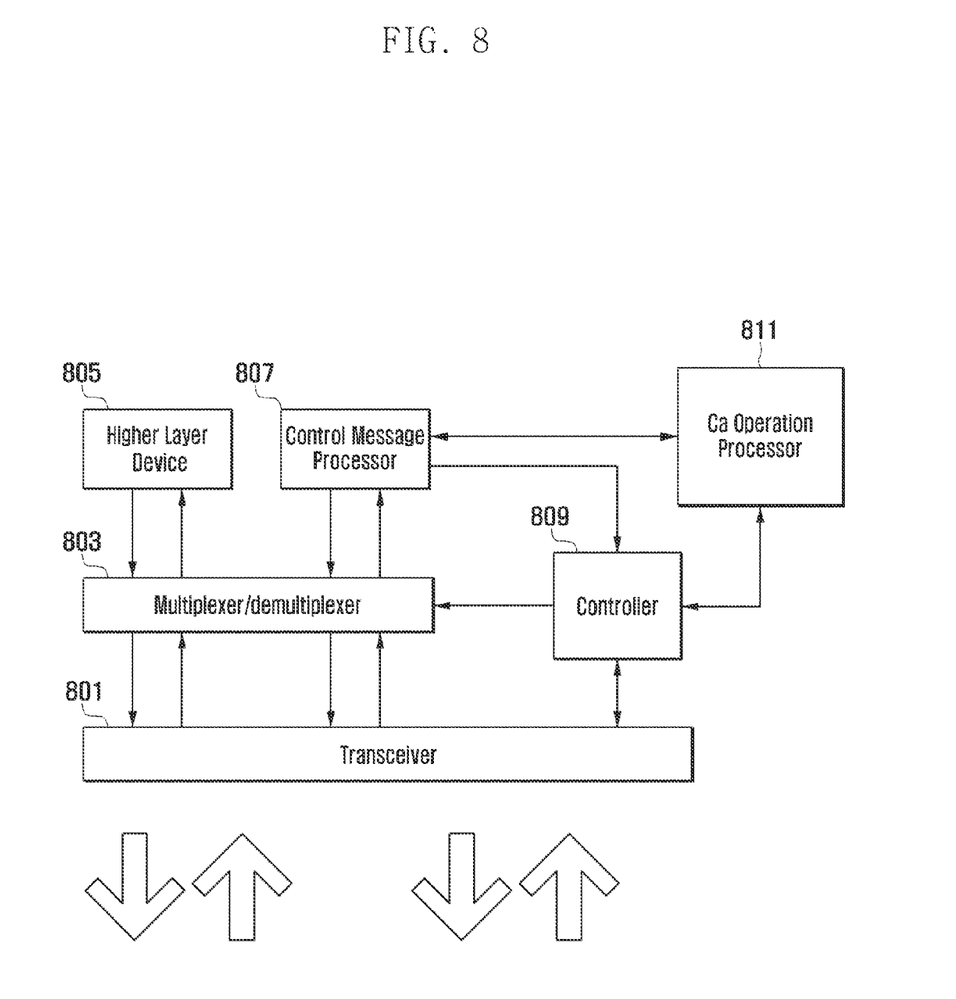
FIG. 8 is a block diagram illustrating a configuration of the UE according to an embodiment of the present invention.

FIG. 8 is a block diagram illustrating a configuration of the UE according to an embodiment of the present invention.

The UE transmits and receives data to and from the higher layer 805. The control message processor 807 transmits and receives control messages. In transmission, the multiplexer 803 multiplexes data and the transceiver 801 transmits the multiplexed data under the control of the controller. In reception, the transceiver 801 receives a physical signal and the demultiplexer 803 demultiplexes the received signal under the control of the controller 809. The demultiplexed signal is delivered to the higher layer device 805 or the control message processor 807 according to the message information.

In the present invention, if the TA command is received, the control message processor determines the message carrying the TA command. If the TA command is received through the TAC MAC CE, the control message processor configures the dedicated time alignment timer or the SCell time alignment timer through RRC message depending the target is PCell or SCell and, otherwise if the TA command is received through RAR, applies the common time alignment timer, dedicated timer alignment timer, or SCell timer alignment timer depending on the situation described with reference to FIG. 7. While maintaining the time value(s), if the P-TAG TAT expires, it is regarded that the uplink synchronization is broken in all of the S-TAGs as well as P-TAG.

Figure 9:
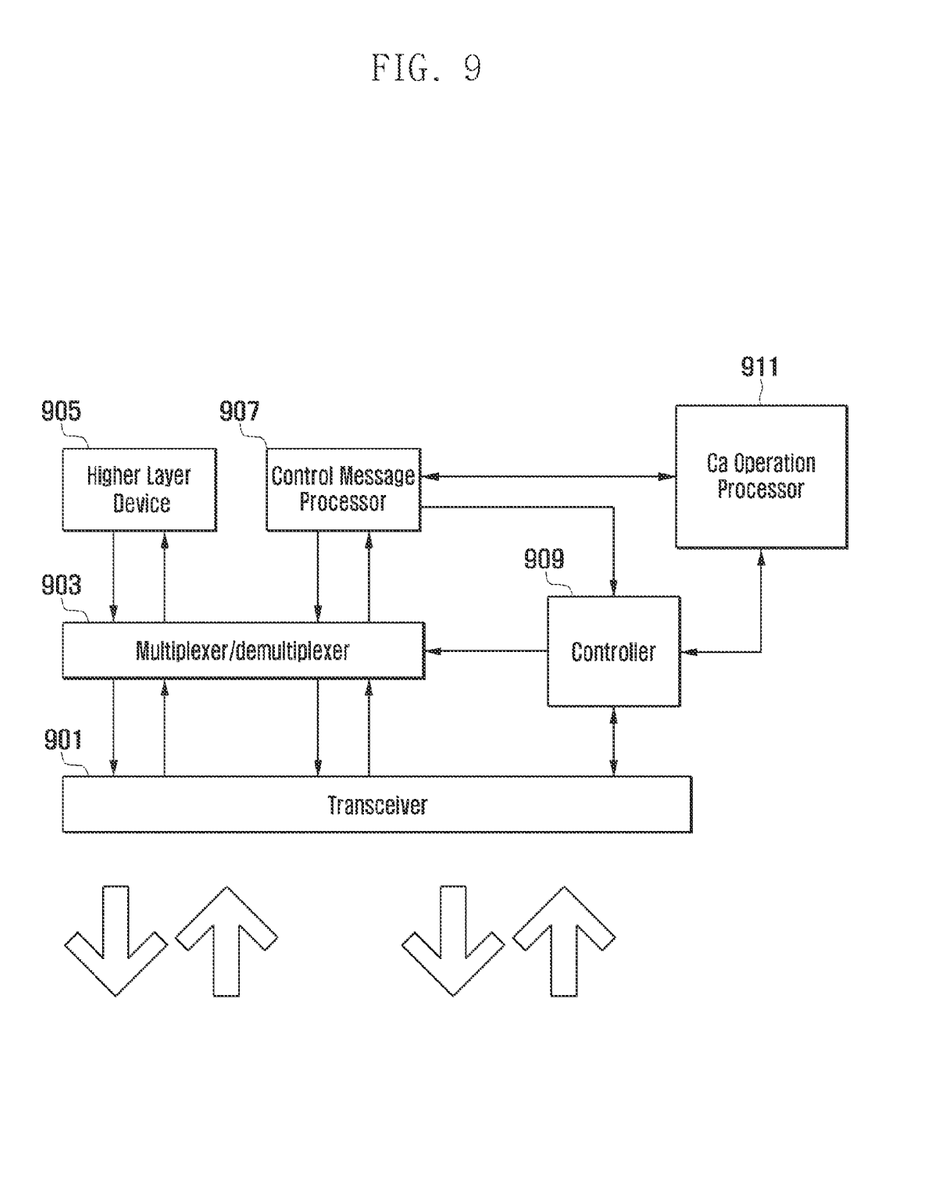
FIG. 9 is a block diagram illustrating a configuration of the eNB according to an embodiment of the present invention.

FIG. 9 is a block diagram illustrating a configuration of the eNB according to an embodiment of the present invention.

The UE transmits and receives data to and from the higher layer 905. The control message processor 907 transmits and receives control messages. In transmission, the multiplexer 903 multiplexes data and the transceiver 901 transmits the multiplexed data under the control of the controller. In reception, the transceiver 901 receives a physical signal and the demultiplexer 903 demultiplexes the received signal under the control of the controller 909. The demultiplexed signal is delivered to the higher layer device 905 or the control message processor 907 according to the message information.

With the proposed method, it is possible to avoid malfunctioning and perform accurate operations by defining UE operation clearly in the system managing a plurality of uplink timings with carrier aggregation technology.

Although the description has been made with reference to particular embodiments, the present invention can be implemented with various modifications without departing from the scope of the present invention. Thus, the present invention is not limited to the particular embodiments disclosed but will include the following claims and their equivalents.

What is claimed is:

1. A method by a base station in a wireless communication system, the method comprising:
    transmitting a system information block including a first timing alignment timer (TAT) which is applicable to a plurality of terminals included in a primary cell;
    transmitting a radio resource control (RRC) message including a second TAT for the primary cell of a terminal included in a primary timing advance group (PTAG) and a third TAT for a secondary cell of the terminal included in a secondary TAG (STAG) with an identity of the STAG to the terminal;
    receiving a random access preamble from the terminal; and
    transmitting a message including a timing advance command (TAC) and an identity of a TAG to the terminal,
    wherein the identity of the TAG is set to 00 when the TAG includes the primary cell.

2. The method of claim 1, wherein the message is one of a medium access control (MAC) control element (CE) message and a radio resource control message.

3. The method of claim 1,
    wherein the second TAT is applied instead of the first TAT by the terminal.

4. A base station in a wireless communication system, the base station comprising:
    a transceiver configured to transmit and receive a signal; and
    a controller configured to:
        transmit a system information block including a first timing alignment timer (TAT) which is applicable to a plurality of terminals included in a primary cell,
        transmit a radio resource control (RRC) message including a second TAT for the primary cell of the terminal included in a primary timing advance group (PTAG) and a third TAT for a secondary cell of the terminal included in a secondary TAG (STAG) with an identity of the STAG to the terminal,
        receive the random access preamble from the terminal,
        transmit a message including a timing advance command (TAC) and an identity of a TAG to the terminal,
    wherein the identity of the TAG is set to 00 when the TAG includes the primary cell.

5. The base station of claim 4, wherein the message is one of a medium access control (MAC) control element (CE) message and a radio resource control message.

6. The base station of claim 4,
    wherein the second TAT is applied instead of the first TAT by the terminal.

7. The method of claim 1,
    wherein each TAT is used to control how long the terminal considers uplink timing of at least one cell belonging to the each TAG is aligned.

8. The method of claim 1,
    wherein the second TAT for the PTAG is transmitted without an identity of the PTAG.

9. The base station of claim 4,
    wherein each TAT is used to control how long the terminal considers uplink timing of at least one cell belonging to the each TAG is aligned.

10. The base station of claim 4,
    wherein the second TAT for the PTAG is transmitted without an identity of the PTAG.

* * * * *